(12) United States Patent
Kondrat

(10) Patent No.: US 9,731,782 B2
(45) Date of Patent: Aug. 15, 2017

(54) SPORT MOTORCYCLE GPS BRACKET

(71) Applicant: Paleo-Tech Concepts, Crystal Lake, IL (US)

(72) Inventor: James W. Kondrat, Crystal Lake, IL (US)

(73) Assignee: Paleo-Tech Concepts, Crystal Lake, IL (US)

( * ) Notice: Subject to any disclaimer, the term of this patent is extended or adjusted under 35 U.S.C. 154(b) by 0 days.

(21) Appl. No.: 14/176,956

(22) Filed: Feb. 10, 2014

(65) Prior Publication Data

US 2014/0225349 A1 Aug. 14, 2014

Related U.S. Application Data

(60) Provisional application No. 61/762,752, filed on Feb. 8, 2013.

(51) Int. Cl.
*B62J 99/00* (2009.01)
*B62J 11/00* (2006.01)

(52) U.S. Cl.
CPC ............... *B62J 11/00* (2013.01); *B62J 99/00* (2013.01); *B62J 2099/0006* (2013.01); *B62J 2099/0033* (2013.01)

(58) Field of Classification Search
CPC ........ B62J 2099/0006; B62J 2099/0026; B62J 2099/0033
USPC ......... 224/413, 419, 420; 248/121; 280/279, 280/280, 288.4; 340/432
See application file for complete search history.

(56) References Cited

U.S. PATENT DOCUMENTS

| | | | | |
|---|---|---|---|---|
| 4,756,454 A | * | 7/1988 | Villanueva et al. | 224/418 |
| 5,001,779 A | | 3/1991 | Eggert et al. | |
| 5,855,388 A | * | 1/1999 | Brewer | 280/288.4 |
| 6,378,815 B1 | * | 4/2002 | Lee | 248/121 |
| 6,764,206 B1 | * | 7/2004 | Felty | 362/476 |
| 6,783,040 B2 | | 8/2004 | Batchelor | |
| 7,942,433 B2 | * | 5/2011 | Miyamoto | 280/279 |
| 7,946,632 B1 | * | 5/2011 | Mueller | 292/1 |
| 2005/0123148 A1 | * | 6/2005 | Ohler | 381/86 |
| 2008/0246247 A1 | * | 10/2008 | Hoshi | 280/280 |
| 2012/0199620 A1 | * | 8/2012 | Gold et al. | 224/413 |
| 2014/0360893 A1 | * | 12/2014 | Whitten et al. | 206/45.2 |

* cited by examiner

*Primary Examiner* — Joseph Rocca
*Assistant Examiner* — Marc A Scharich
(74) *Attorney, Agent, or Firm* — Michael J. Femal; Much Shelist

(57) ABSTRACT

A mounting bracket plate for a personal electronic device for attaching to a motor vehicle.

2 Claims, 7 Drawing Sheets

SPORT MOTORCYCLE GPS BRACKET

CROSS REFERENCE TO RELATED APPLICATION

The present disclosure is related to U.S. Provisional Patent Application Ser. No. 61/762,752 which is expressly incorporated herein by reference in their entirety to form a part of the present disclosure.

FIELD OF INVENTION

The field of this invention is an apparatus or system for the detachable mounting and use of portable electronic devices on motor vehicles. More specifically, the field of this invention is an apparatus or system for detachably mounting and using portable electronic devices such as a GPS, radios, CD players, cassette tape players, video cameras, two-way or CB radios, or cell phones onto the handle bars of vehicles such as motorcycles, snowmobiles, personal watercraft, etc.

DESCRIPTION OF RELATED ART

Many devices have been proposed for assisting in the mounting and use of portable electronic devices on vehicles such as motorcycles which may not be initially equipped by the manufacturer with ways to mount certain portable electronic devices. The device in U.S. Pat. No. 5,001,779 to Eggert et al. is exemplary of mounting arrangements for motorcycle stereo system. The device in the Eggert patent employs a soft-sided bag or box to hold a portable radio and speakers on a motorcycle. The Eggert device suffers, however, from several substantial drawbacks. For one, the speakers on the Eggert device do not enjoy any degree of adjustability relative to the rest of the hag or box. The Eggert device is not as easily detachable and attachable to the motorcycle as would be desired. Further, the Eggert device is not very securely mounted on the motorcycle. Because of the way it is mounted, it is possible for the bag or box to slide to either side of the motorcycle's fuel tank. Also, the Eggert device and some of the other proposed devices in the prior art are not as easily adapted, as would be desirable, to carry portable electronic devices of different sizes and configurations such as GPS devices or holding a cell phone and its speaker system. The Eggert soft-bag concept would not be suitable for the current devices like a handheld GPS device or an iPods or an iPads with a GPS feature.

Neither the Eggert patent nor any of the other prior art disclosures show a universal accessory mounting bar for assisting in the mounting of small portable electronic devices to vehicles such as a motorcycle. Also, neither the Eggert patent nor any of the other prior art disclosures show a convenient method for powering portable electronic devices mounted to vehicles such as motorcycles.

The device in U.S. Pat. No. 6,783,040 to Batchelor is exemplary of yet another aftermarket mounting arrangements for a motorcycle stereo system or other portable electronic device. The strap arrangement does a better job of securing the portable device to the motorcycle's fuel tank because the straps go around the tanks circumference as well as lengthwise. However, the Batchelor device still has the drawbacks that it would take several different configurations of the holding straps or even replacement of straps to fit different device such as something as small as a GPS device, iPod or iPad to the motorcycle.

Therefore, neither the Eggert or Batchelor patents nor any other prior art disclosures show a universal accessory mounting bar for assisting in the mounting of small portable devices to a motorcycle that is easily adaptable to any type of device by a simple change of a gimbal ball that many of these type of portable devices now have cases allowing attachment to a ball.

SUMMARY OF THE INVENTION

One embodiment of the invention is an accessory device which allows the secure attachment of aftermarket UPS or electronic devices to the steering handlebars of a sport type motor vehicle by utilizing the existing components or hardware associated with the motor vehicle, specifically, the "fork bolt" of a motorcycle for example.

Further, the present invention uses an integrated "C" clamp at either end of a generally flat metal bar or bracket plate that ties into the "fork bolt", a portable device like a GPS, which then becomes an integral part of the motorcycle's chassis without inhibiting any normal operation of the motorcycle. The metal bracket with the "C" clamps attachment between the two fork bolts on either side of the front wheel do not modify the motorcycle's original design in any way or present a hazard to operator in case of an impact to the motorcycle chassis from road hazards or the like. The present invention apparatus or system for mounting portable electronic devices to the motorcycle provides a clean, clear, and reliable method of securing a GPS or other portable electronic device like an iPhone, iPod or iPad to the vehicle with the least amount of distractions to the operator because of the hands free mode of operation. Full range of handlebar motion is retained as is all access to the motorcycles controls and indicators on the vehicle.

A preferred GPS Bracket Plate is formed on a CNC machine and is preferably machined from ¼" 6061 aluminum plate or similar metal or stainless steel. A $^{43}/_{62}$" phenolic ball is secured by an 8-32×½" stainless steel screw to the bottom center half of the plate and serves as the universal mounting point for an existing GPS device like a Garmin GPS cradle currently available on the market. Additional ball mounts can be substituted to accommodate other brands of GPS devices or other electronic portable devices like iPhones, iPods or iPads. In addition, sufficient room exists to accommodate various brands of cell phone mounting solutions such as produced by ROKFORM and expressly incorporated herein by reference in their entirety to form a part of the present disclosure.

In the preferred embodiment, the plate is designed with integral "C" clamps on either side that fit tightly onto the "fork bolts" of the motorcycle and are tightened by 4-40×½" stainless steel screws. Removal of the GPS Bracket Plate involves loosening the two 4-40×½" stainless steel screws and lifting plate off of the fork bolts.

Once mounted, the GPS Bracket Plate's allows the rider to mount his/her GPS or electronic device and adjust to the optimum viewing angle by rotating the cradle on the GPS Bracket Plate's phenolic ball. Friction between the GPS cradle and phenolic ball is such that the rider may continue to use the GPS's touch screen without worry of bringing the GPS out of this preferred alignment. This friction is also great enough to prohibit any unintentional rotation due to vibration from the motorcycle's power-plant or uneven road conditions. Removal of GPS and the GPS cradle is consistent with GPS OEM mounting devices in that the cradle may be removed by simply lifting with sufficient force popping the phenolic ball out of the mounting cradle's socket.

Dimensions of the GPS Bracket Plate are custom made to the specific brand and model of the vehicle or sport motorcycle, but the overall design remains consistent using two "C" clamps on either side of the plate and a span of material between said "C" clamps which is designed and configured in shape not to restrict access to ignition or other controls on the handlebars.

DETAIL DESCRIPTION OF THE INVENTION

For the sake of convenience and clarity, the principles of the invention will be described with reference to the specific embodiments of the invention depicted in the accompanying illustrations. However, it should be understood that the specific embodiment depicted is meant to be illustrative of the invention's principles. Describing the invention through use of a single specific embodiment is not meant to limit the scope of the invention to the specific embodiment. The scope of the invention is set forth in, and should be measured by, the accompanying claims.

The invention relates to systems for detachably mounting and using portable electronic devices (PEDs) on vehicles such as a motorcycle. By way of example, a portable electronic device might include a portable GPS, a radio, a CD player, an iPhone, an iPad, a video camera, two-way or CB radios, a radar detector, another type of GPS reader, or other like devices of similar size, weight and purpose. The term PED is used herein broadly to encompass any of these devices which may be desirable to use on or with a vehicle like a motorcycle.

More specifically, the invention relates to systems for detachably mounting and using PEDs on open motor vehicles. An open vehicle includes, by way of example, a motorcycle, three- and four-wheeled all-terrain vehicles (ATVs), a snowmobile, a personal watercraft such as a wave runner or jet ski, or other like vehicles. These vehicles generally include handle bars with fork bolts or the like and are for use typically by only one operator and possibly a small number of passengers, and are characterized by an absence of an enclosure separating the operator or passengers from the atmosphere and surrounding environment. The lack of an enclosure also means that instruments mounted to the vehicle for access and use by the operator or passengers are not protected against the elements, and are not secured against access by others, including thieves or vandals. If a PED is to be mounted to these vehicles for access and use by the operator or passengers, the PED should have provisions for protecting it from the surrounding environment, and for securing it against unauthorized access.

Figure 6:
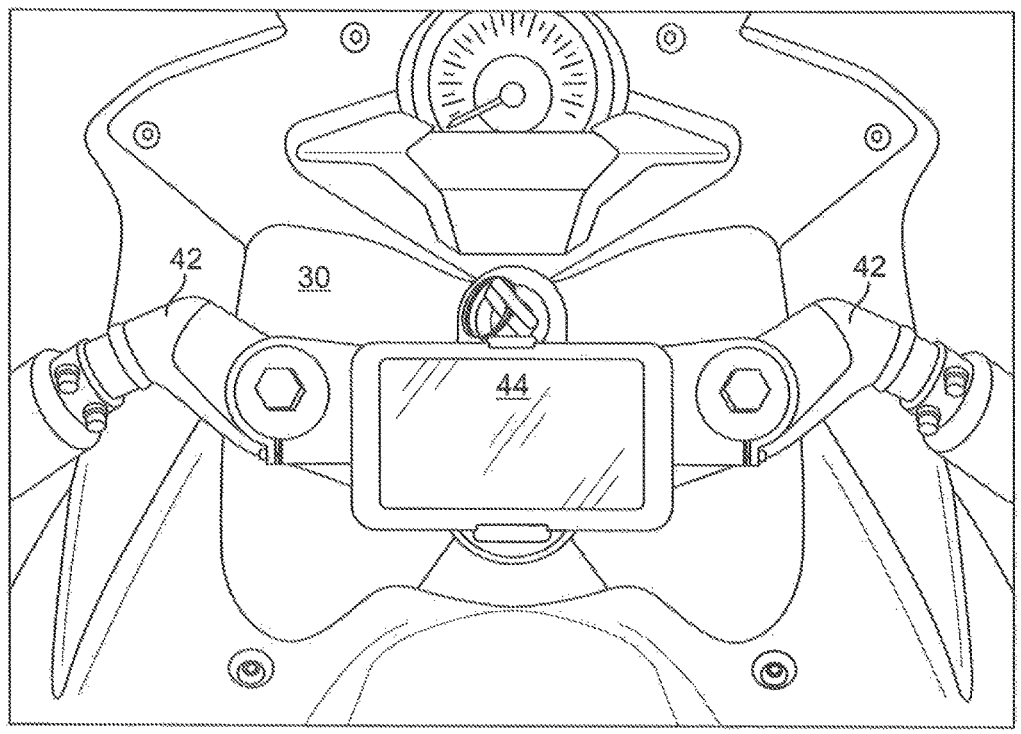
FIG. 6 is a GPS device mounted to the apparatus of the invention of FIG. 1.
Figure 7:
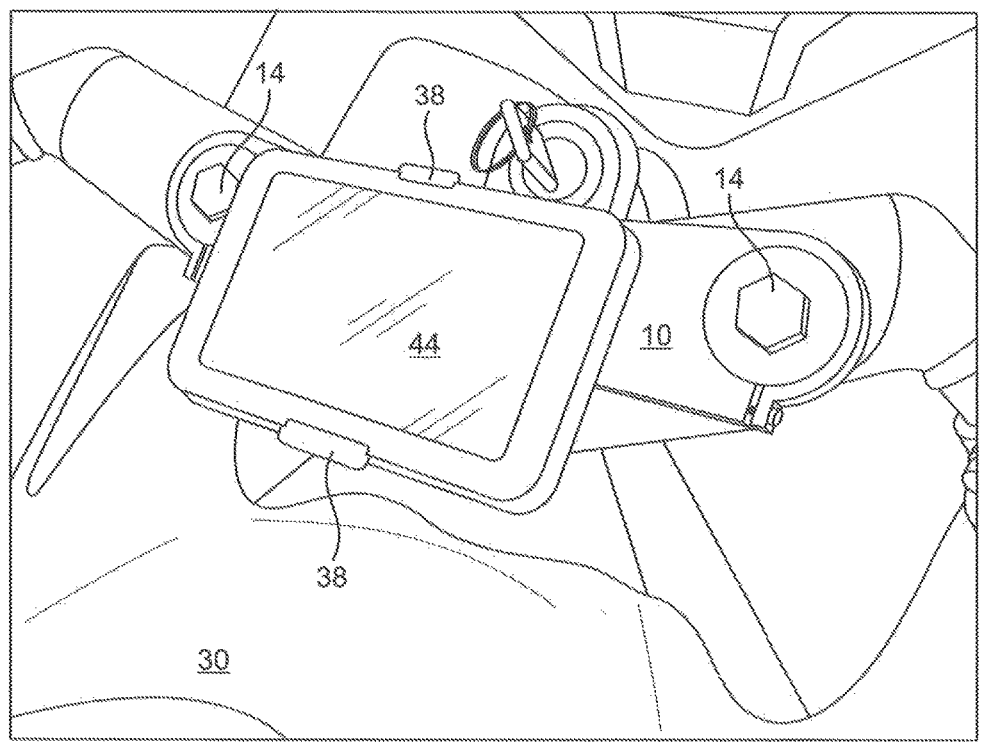
FIG. 7 is a right side view of a GPS device mounted to the apparatus of the invention of FIG. 1.

The illustrated embodiment includes an apparatus or system for detachably mounting and using a portable GPS device on a motorcycle. The principles of the invention are equally and in a similar manner applicable to other types of PEDs and to other types of vehicles. FIGS. 6 and 7 illustrate from two separate perspectives a motorcycle with a PED or GPS mounted thereon. The other FIGs. show the same or various perspective of the apparatus or system, but also show the mounting apparatus or system in FIG. 9 where the apparatus has been removed from the motorcycle for illustrative purposes.

Figure 1:
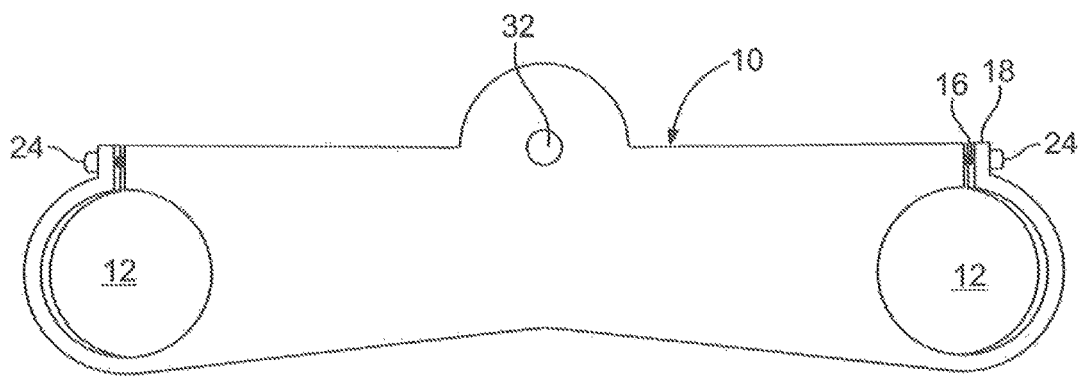
FIG. 1 is a top plan view of an apparatus in the present invention.

Turning now to FIG. 1, a generally flat metal bar or bracket plate 10 with an integrated "C" clamp 12 at either end of bracket ties into the fork bolts 14 to be described later. Each "C" clamp 12 includes a pair of opposing holes 16 and 18 at an opening 20 at an end 22 of the "C" clamp 12. The hole 16 is of a predetermined depth with internal threads for receiving complimentary threads on the shaft of a screw or bolt 24 therein. The hole 18 is a through opening through a portion 26 for passing the threading shaft 28 of bolt 24 therethrough into the threaded hole 16 for tightening and securely affixing the "C" claim 12 around a fork bolt 14 on a motor vehicle 30. Another through opening 32 goes through the plate 10 for attaching a mounting device on top of the plate 10 with a screw or bolt 34.

Figure 2:
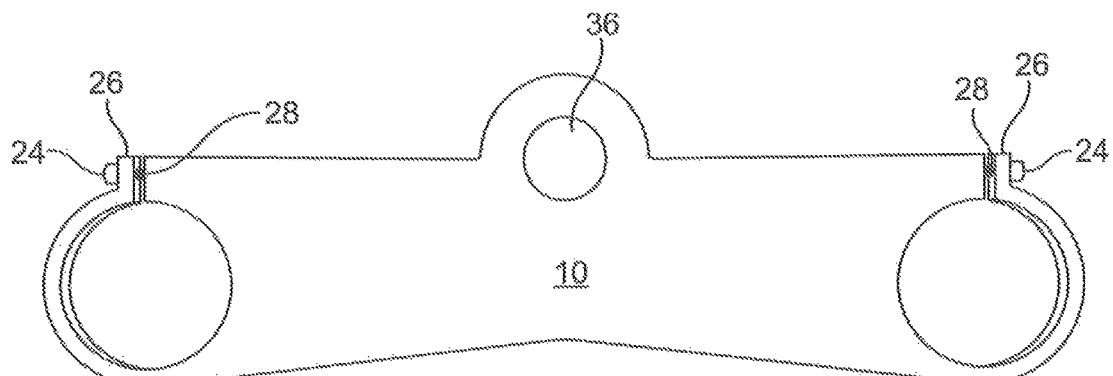
FIG. 2 is a top plan view of the apparatus in FIG. 1.

FIG. 2 shows a top plan view of the bracket plate 10. A preferred GPS Bracket Plate 10 is formed on a CNC machine and is preferably machined from ¼" 6061 aluminum plate or similar metal or stainless steel. A $^{43}/_{62}$" phenolic ball 36 is secured by an 8-32×½" stainless steel screw 34 to the bottom center half of the plate hole 32 in FIG. 3 and serves as the universal mounting point for an existing GPS device 38 like a Garmin GPS cradle currently available on the market. Additional ball mounts 36 can be substituted to accommodate other brands of GPS devices or other electronic portable devices like iPhones, iPods or Wads. In addition, sufficient room exists to accommodate various brands of cell phone mounting solutions such as produced by ROKFORM.

In the preferred embodiment, the plate 10 is designed with integral "C" clamps 12 on either side that fit tightly onto the fork bolts 14 of the motor vehicle 30 and are tightened by 4-40×½" stainless steel screws 24. Removal of the GPS Bracket Plate 10 involves loosening the two 4-40×½" stainless steel screws 24 and lifting plate 10 off of the fork bolts 14.

Figure 3:
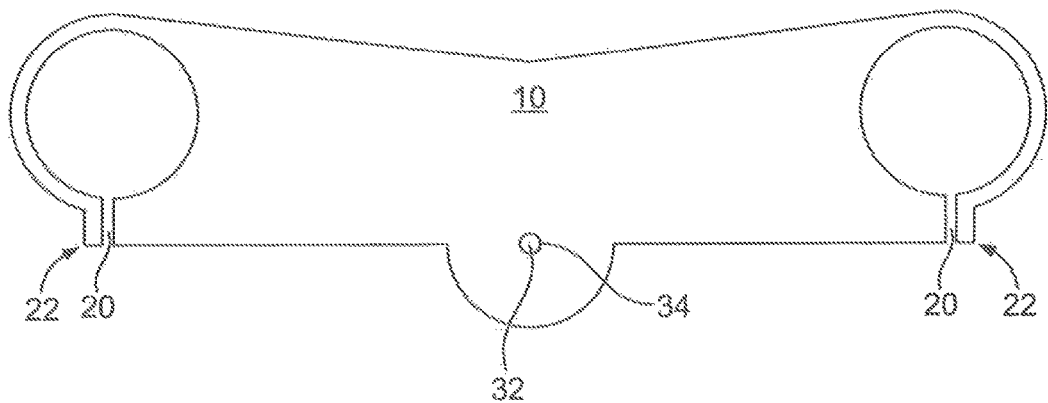
FIG. 3 is a further bottom plan view of the apparatus in FIG. 1.

FIG. 3 shows a bottom plan view of the Bracket Plate 10 without the screws 24 in the holes 16 and 18 of the "C" clamps 12 or the screw 34 for securely affixing the phenolic ball 36 to the top of the plate 10.

Figure 4:
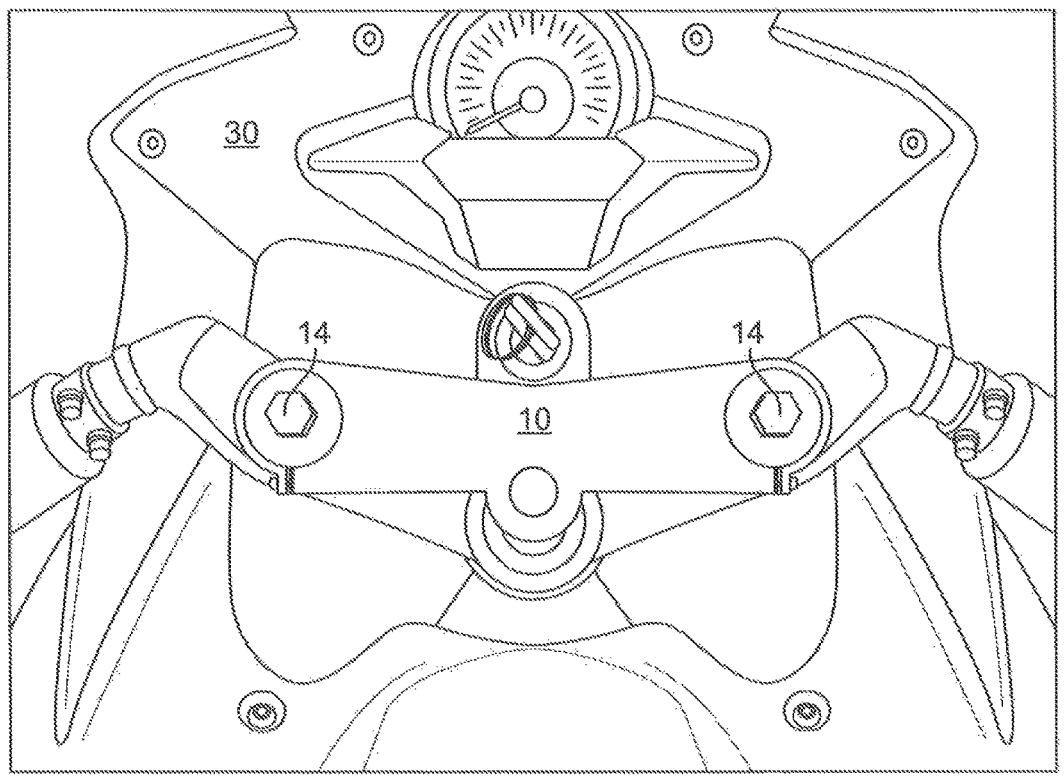
FIG. 4 is a top plan view of the apparatus mounted on a motorcycle.

FIG. 4 shows a motorcycle vehicle 30 with the plate 10 attached by the C-Clamps 12 to the fork bolts 14 on chassis 40 of the motorcycle 30. As observed, there is no restrictions created by the plate 10 with functioning of the handle bars 42 of the motorcycle 30 for the operator or rider. This is important to improve the safety of the rider during operation of the motorcycle 30. Moreover, the secure attachment to the fork bolts 28 prevents the mounted PED from flying loose and injuring the rider or have the PED struck by another vehicle or object if such mounting occurred on an attachment to a side mirror on the motorcycle 30. The secure mounting of the PhD is in the same space as the rider so essential if the rider is free from injury so is the PED. Moreover, the mounting of the PED on the bracket 10 makes the operation essentially hands free for the GPS or smartphone so the rider can keep both hands on the handle bars whiles using a bluetooth earpiece or other similar device that automatic answers the phone call and then allow you to listen without ever removing your hands from the handle bars.

Figure 5:
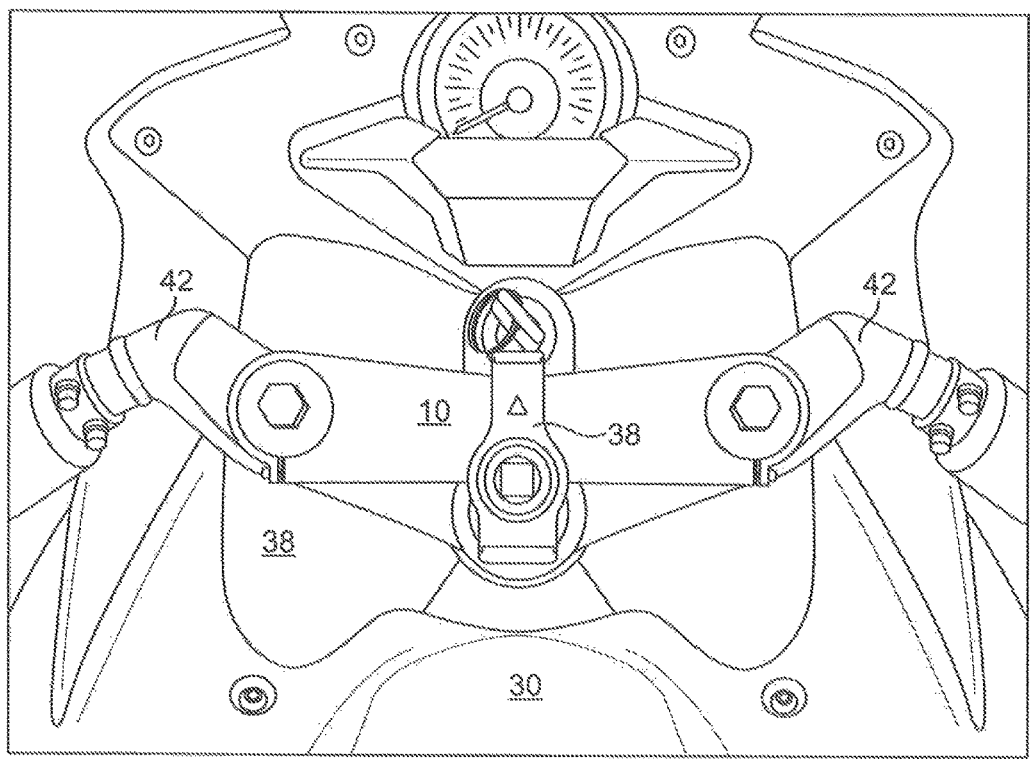
FIG. 5 is a further top plan view of the apparatus mounted on a motorcycle with GPS bracket mounted on the gimbal ball of FIG. 2.

FIG. 5 shows the mounting bracket plate 10 mounted securely on the fork bolts 14 of a motorcycle with a Garman GPS or smartphone mounting device 38 attached to the phenolic ball 36. This provides the stable platform and fixedly secures the attachment of the GPS or PhD devices to the motorcycle where the rider does not having an obstructions to viewing the instrument panel or other key controls on the motorcycle.

FIG. 6 shows the Garman GPS unit 44 attached to its mounting device 38 that is attached to the phenolic ball 36 so the rider can adjust the angle at which the screen on the GPS is viewed. And due to the friction of the ball 36 against the socket on the typical Garman GPS mounting device, it remains in place during the ride no matter how bumpy the ride might be or jarring the mounting device receives in its attachment to the bracket plate 10.

FIG. 7 is a right side view of the GPS or smartphone mounting device 38 attached to the bracket plate 10 attached fixedly to the fork posts on the motorcycle. Again just a glance by the rider permits a view of the GPS and with the smartphone and current BlueTooth technology ear or helment pieces, there is no need for the rider even to look down at the smartphone and be distracted while driving the motorcycle. This provides a hands free connection to the smartphone without any distractions while riding the motorcycle.

Figure 8:
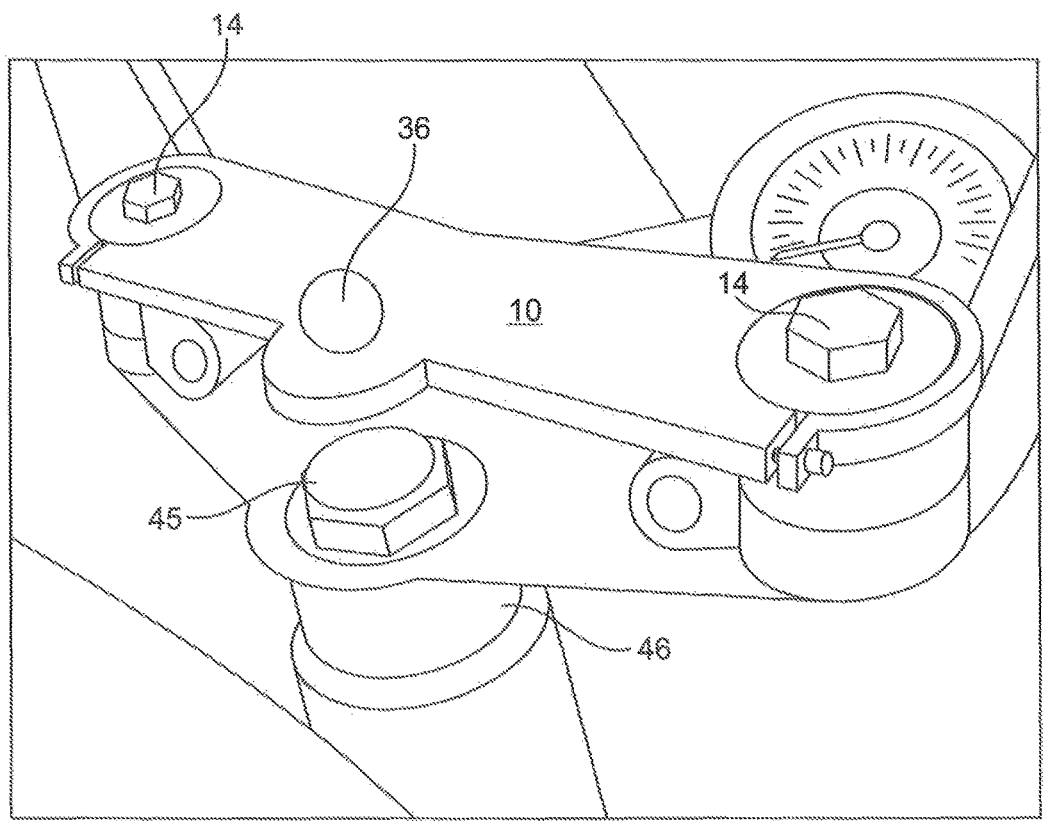
FIG. 8. is a right side view of the apparatus and its gimbal ball of the invention of FIG. 1.

FIG. 8 shows the secure connection of the bracket plate 10 to the fork bolts 14 of the typical motorcycle 30 where the bracket plate 10 clears a center bolt 45 on the steering column 46 to show that there is no obstruction to the functioning of the motorcycle 30 when the bracket plate 10 is attached thereto.

Figure 9:
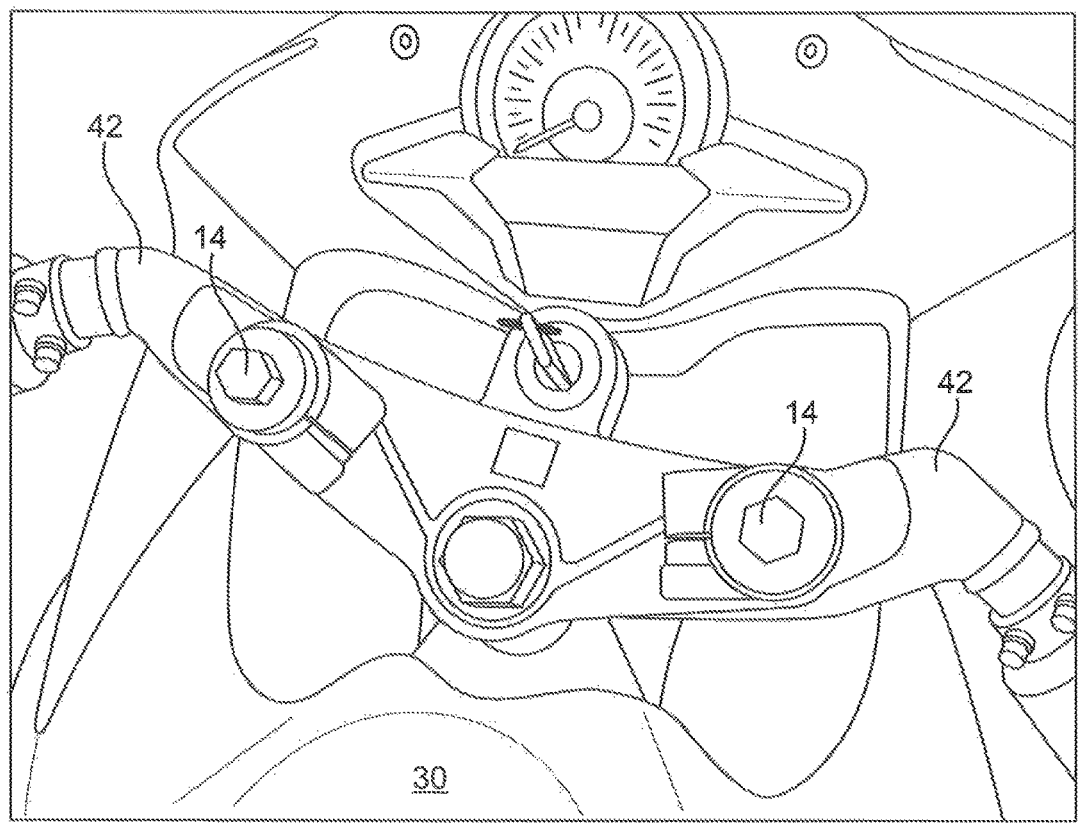
FIG. 9. is a top view of the motorcycle fork bolts without the invention of FIG. 1.

FIG. 9 shows the motorcycle without the attached bracket plate 10 and when comparing FIG. 9 to FIGS. 4-8 that there are no key components, controls or hardware on the motorcycle that are obstructed by the attachment of the bracket plate 10 to mount a PED to the motorcycle.

Figure 10:
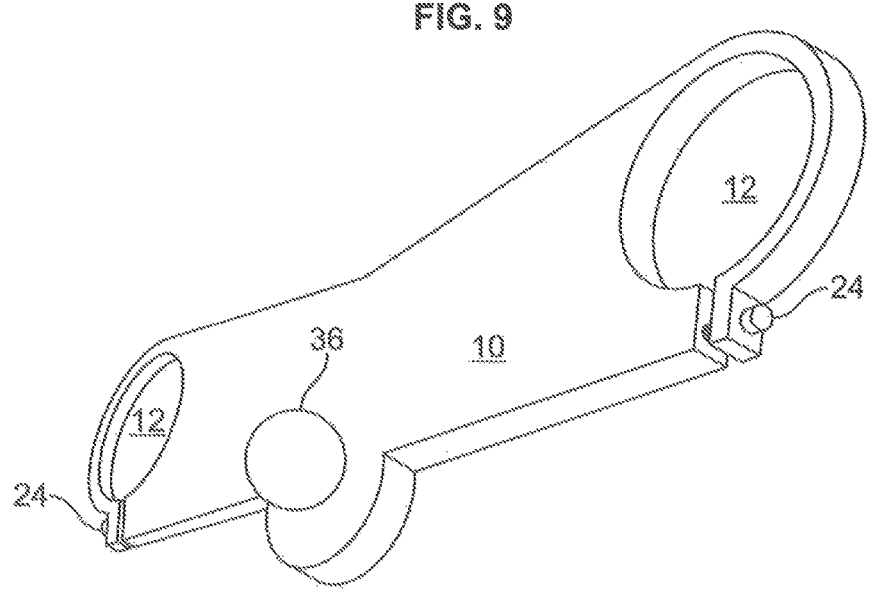
FIG. 10 is a right side view of the apparatus of FIG. 1.

FIG. 10 show a perspective view of the mounting bracket plate 10 where the "C" clamp and the screw or bolt 24 affixed between the through hole and the threaded hole on the main part of the body of the clamp 12.

Once again, the metal bracket 10 with the "C" clamps 12 at opposing ends of the bracket attach to two fork bolts on either side of a front wheel of a motor vehicle 30 do not modify the motor vehicle's original design in any way or present a hazard to operator in case of an impact to the motor vehicle chassis from hazards on roads, fields or water and the like. FIG. 1 also shows a bottom plan view of the plate 10 with a hole 16 for inserting a screw or bolt therethrough for mounting a device.

Therefore, it is intended that the invention not be limited to the particular embodiment disclosed as the best mode contemplated for carrying out this invention, but that the invention will include all embodiments falling within the scope of the appended claims.

Having thus described the invention, I claim:

1. A portable electronic device (PED) mounting apparatus for detachably mounting a PED to a motorcycle, the PED mounting apparatus comprising:
    a generally flat and elongated mounting bar having a predetermined length;
    a pair of opposing "C" clamps formed in opposing ends of the mounting bar;
    a fastener disposed in each "C" clamp for securely affixing the pair of "C" clamps to a respective pair of fork bolts spaced apart at a predetermined distance on the motorcycle such that the mounting bar is selectively attachable to or detachable from the motorcycle;
    a mounting device for the PED, the mounting device generally extending upwardly from and perpendicular to the mounting bar and generally located in a center of the mounting bar to attach to a PED mounting bracket; and
    wherein, when the mounting bar is attached to the fork bolts on the motorcycle, the mounting bar is spaced above a generally vertically-extending center bolt of a steering column on the motorcycle and at least a portion of the mounting bar extends over and at least partially covers the center bolt from above.

2. The portable electronic device (PED) mounting apparatus of claim 1, wherein each "C" clamp includes an opening between two clamping surfaces on the "C" clamp and wherein the opening on the "C" clamp is configured to be narrowed between the two clamping surfaces by tightening the fastener, which passes through a hole on one of the clamping surfaces, and threading the fastener into a threaded hole on the opposite clamping surface to close the opening and tighten the engagement of the "C" clamp on the fork bolt; and
    wherein the mounting device comprises a ball mount for attaching the PED to the mounting bar.

* * * * *